United States Patent
Sano et al.

[11] Patent Number: 5,877,934
[45] Date of Patent: Mar. 2, 1999

[54] CERAMIC COMPOSITION AND MULTILAYER CERAMIC CAPACITOR MADE THEREFROM

[75] Inventors: Harunobu Sano, Kyoto; Kazuhiro Harada, Shiga-ken, both of Japan

[73] Assignee: Murata Manufacturing Co., Ltd., Japan

[21] Appl. No.: 985,825

[22] Filed: Dec. 5, 1997

[30] Foreign Application Priority Data

Dec. 6, 1996 [JP] Japan ..................... 8-326912

[51] Int. Cl.$^6$ ................ H01G 4/20; H01G 4/06
[52] U.S. Cl. ............ 361/312; 361/321.5; 361/320; 501/134; 501/137
[58] Field of Search .................. 361/306.3, 309, 361/311, 312, 313, 308.1, 321.1–321.5, 320, 322, 330; 501/134, 135, 136, 137, 138, 139; 29/25.42; 252/62.9

[56] References Cited

U.S. PATENT DOCUMENTS

| | | | |
|---|---|---|---|
| 4,574,329 | 3/1986 | Eijkelenkamp et al. | 361/321.2 |
| 4,610,971 | 9/1986 | Wada et al. | 501/137 |
| 4,985,381 | 1/1991 | Mori et al. | 501/136 |
| 5,036,424 | 7/1991 | Sano et al. | 361/321.4 |
| 5,117,326 | 5/1992 | Sano et al. | 361/321 |
| 5,659,456 | 8/1997 | Sano et al. | 361/321.4 |
| 5,734,545 | 3/1998 | Sano et al. | 361/321.4 |

*Primary Examiner*—Kristine Kincaid
*Assistant Examiner*—Anthony Dinkins
*Attorney, Agent, or Firm*—Ostrolenk, Faber, Gerb & Soffen, LLP

[57] ABSTRACT

A multilayer ceramic capacitor is made of a principal component (100 mol) represented by the compositional formula $$(1-\alpha-\beta)\{BaO\}_m \cdot TiO_2 + \alpha Re_2O_3 + \beta(Mn_{1-x-y}Ni_xCo_y)O$$

(where $Re_2O_3$ is at least one of $Y_2O_3$, $Tb_2O_3$, $Dy_2O_3$, $Ho_2O_3$, $Er_2O_3$ and $Yb_2O_3$; and $\alpha$, $\beta$, $m$, $x$, and $y$ are $0.0025 \leq \alpha \leq 0.025$, $0.0025 \leq \beta \leq 0.05$, $\beta/\alpha \leq 4$, $0 \leq x < 1.0$, $0 \leq y < 1.0$, $0 \leq x + y < 1.0$, and $1.000 < m \leq 1.035$.), a secondary component (about 1–3.0 mol) of magnesium oxide (MgO), and $Al_2O_3$-MO-$B_2O_3$ oxide glass (where MO is at least one of BaO, CaO, SrO, MgO, ZnO and MnO) in an amount of about 0.2–3.0 parts by weight for 100 parts by weight of the total amount of said principal component and secondary component.

19 Claims, 3 Drawing Sheets

CERAMIC COMPOSITION AND MULTILAYER CERAMIC CAPACITOR MADE THEREFROM

BACKGROUND OF THE INVENTION

1. Field of the Invention

The present invention relates to a ceramic composition and a multilayer ceramic capacitor made therefrom for electronic machines and equipment, and more particularly to a multilayer ceramic capacitor having internal electrodes of nickel or nickel alloy.

2. Description of the Prior Art

Multilayer ceramic capacitors are produced conventionally by a process which consists of the following steps. First, a dielectric ceramic material is prepared which is in the form of sheet with a surface coating material to be converted later into an internal electrode. This dielectric ceramic material is composed mainly of $BaTiO_3$. Second, several pieces of coated sheets are stacked and bonded together by heating under pressure. The resulting monolithic assembly is fired at 1250°–1350° C., thereby giving a consolidated stack of dielectric ceramic layers having internal electrodes. Finally, the end faces of the stack are provided with external electrodes which communicate with the internal electrodes.

The above-mentioned process requires that the internal electrodes be made of a material which satisfies the following two conditions.

(a) It should have a melting point higher than the firing temperature of the dielectric ceramic material because the internal electrodes are formed simultaneously with the firing of the dielectric ceramic material.

(b) It should not oxidize even in an oxidizing atmosphere at high temperature, nor should it react with the dielectric ceramic material.

This requirement is met conventionally by making electrodes from noble metal such as platinum, gold, palladium and silver-palladium alloy. Unfortunately, they are expensive, albeit superior in characteristic properties. This causes the material for electrodes to account for a large portion in the cost of multilayer ceramic capacitor and hence is the prime factor in increasing the production cost.

Besides noble metals, there are high-melting base metals such as Ni, Co, W, and Mo. Unfortunately, they easily oxidize in an oxidizing atmosphere at high temperature, and fail to function as an electrode. For these base metals to be used as internal electrodes of a multilayer ceramic capacitor, it is necessary that they be fired, together with dielectric ceramics, in a neutral or reducing atmosphere. Unfortunately, conventional ceramic materials undergo substantial reduction to become a semiconductor upon firing in such an atmosphere.

In order to eliminate this disadvantage, there have been proposed new ceramic materials as disclosed in Japanese Patent Publication No. 42588/1982 and Japanese Patent Laid-open No. 101359/1986. The first is characterized by the solid solution of barium titanate containing barium and titanium in a ratio greater than the stoichiometric one. The second is characterized by the solid solution of barium titanate with rare earth oxides such as $La_2O_3$, $Nd_2O_3$, $Sm_2O_3$, $Dy_2O_3$ and $Y_2O_3$.

There have also been proposed new dielectric ceramic materials less liable to change in permittivity with temperature, as disclosed in Japanese Patent Laid-open No. 256422/1987 and Japanese Patent Publication No. 14611/1986. The former has a composition of $BaTiO_3$-$CaZrO_3$— $MnO$—$MgO$, and the latter has a composition of $BaTiO_3$—(Mg, Zn, Sr, Ca)O—$B_2O_3$—$SiO_2$. These dielectric ceramic materials do not become a semiconductor even on firing in a reducing atmosphere. Thus they permit the production of multilayer ceramic capacitors having internal electrodes of basic metal such as nickel.

Recent developments in electronics has promoted the size reduction of electronic parts, and there is a marked trend for multilayer ceramic capacitors to become smaller in size and larger in capacity, with the dielectric ceramic material increasing in permittivity and the dielectric ceramic layers decreasing in thickness. This has aroused a growing demand for reliable dielectric ceramic materials which have a high permittivity and a small change with temperature in permittivity.

The requirement for high permittivity is met by the above-mentioned dielectric ceramic materials (disclosed in Japanese Patent Publication No. 42588/1982 and Japanese Patent Laid-open No. 101359/1986). However, they suffer the disadvantage of giving rise to a dielectric ceramic having such large crystal grains that the number of crystal grains present in one layer is so small as to impair reliability in the case where the dielectric ceramic layer is thinner than 10 $\mu$m. Moreover, they greatly change in permittivity with temperature. Thus they have not yet gained market acceptance.

These disadvantages are overcome by the above-mentioned dielectric ceramic material (disclosed in Japanese Patent Laid-open No. 256422/1987) which has a comparatively high permittivity, gives rise to a dielectric ceramic with small crystal grains, and is less liable to change in permittivity with temperature. However, it has a problem with reliability at high temperatures because $CaZrO_3$ and $CaTiO_3$ (which appear during firing) easily form the secondary phase together with Mn.

The above-mentioned dielectric ceramic material (disclosed in Japanese Patent Publication No. 14611/1986) gives rise to a dielectric ceramic which has a permittivity of 2000–2800 and hence it is unfavorable for producing multilayer ceramic capacitors with a reduced size and an increased capacity. In addition, it does not meet the EIA standards (X7R) which provides that the change in electrostatic capacity at temperatures ranging from −55° C. to +125° C. should be within ±15%.

Moreover, there is disclosed a non-reducing dielectric ceramic in Japanese Patent Laid-open No. 103861/1988. It suffers the disadvantage that it greatly changes in insulation resistance and capacity with temperature depending on the crystal grain size of $BaTiO_3$, its principal component. This poses difficulties in control for stable characteristic properties. In addition, it is not of practical use because it has an insulation resistance and an electrostatic capacity such that their product (CR) is 1000–2000 M$\Omega$·$\mu$F.

In order to address the above-mentioned problems, there have been proposed a variety of compositions in Japanese Patent Laid-open Nos. 9066/1993, 9067/1993, and 9068/1993. However, even they do not meet the recent stringent requirements for small size, large capacity and thin layer, as well as reliability.

Reliability greatly decreases if the thickness of the dielectric ceramic layer is simply reduced, with the rated voltage kept constant, because this increases the electric field strength per layer and lowers the insulation resistance at room temperature and high temperatures. Therefore, it is necessary in the case of conventional dielectric ceramic materials, to lower the rated voltage if the thickness of the dielectric ceramic layer is to be reduced.

The foregoing has caused a demand for a highly reliable multilayer ceramic capacitor which maintains the rated voltage despite the dielectric ceramic layers with a reduced thickness and has a high insulation resistance in a strong electric field.

In the meantime, it is common practice in the case of small-size, large-capacity multilayer ceramic capacitors, to coat their external electrodes (which can be formed by sintering from electrically conductive metal powder) with a plated film so as to facilitate their surface mounting. The plated film is formed usually by electrolytic plating. However, this practice impairs reliability because when multilayer ceramic capacitors are immersed in a plating solution to form a plated film, the plating solution infiltrates into minute voids in the electrodes (which occur when electrically conductive metal powder is sintered), reaching the interface between the internal electrode and the dielectric ceramic layer.

OBJECT AND SUMMARY OF THE INVENTION

It is an object of the present invention to provide a multilayer ceramic capacitor which is small in size, large in capacity, and low in price and yet maintains high reliability even when a plated coating is formed on its external electrodes. This multilayer ceramic capacitor is characterized by a permittivity higher than 3000, an insulation resistance (at 2 kV/mm) higher than 6000 MΩ·μF and 2000 MΩ·μF at room temperature and 125° C., respectively, and an insulation resistance (at 20 kV/mm) higher than 2000 MΩ·μF and 500 MΩ·μF at room temperature and 125° C., respectively, in terms of a product (CR) of insulation resistance and electrostatic capacity, and an electrostatic capacity whose temperature characteristics satisfy requirement B provided in the JIS standards and requirement X7R provided in the EIA standards.

DESCRIPTION OF THE PREFERRED EMBODIMENTS

Figure 1:
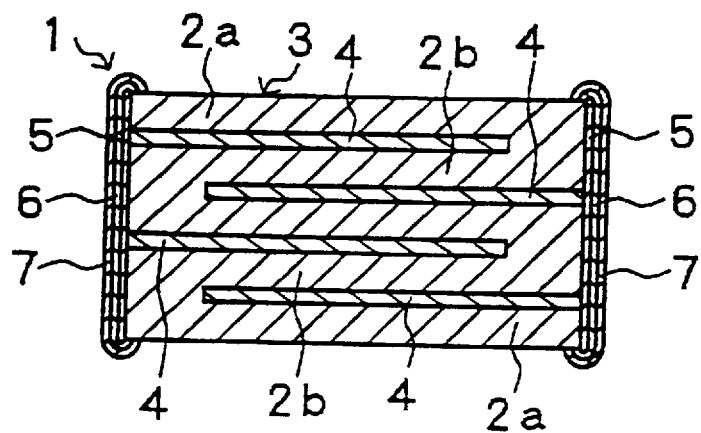
FIG. 1 is a schematic sectional view showing an embodiment of the multilayer ceramic capacitor as the present invention.

The first aspect of the present invention resides in a multilayer ceramic capacitor of the type having a plurality of dielectric ceramic layers, a plurality of internal electrodes formed between said ceramic layers such that edges are exposed at both end faces of said dielectric ceramic layers, and external electrodes electrically connected to said exposed internal electrodes, characterized in that said dielectric ceramic layer is composed of barium titanate containing about 0.02 wt % or less of alkali metal oxide as an impurity, at least one member selected from yttrium oxide, terbium oxide, dysprosium oxide, holmium oxide, erbium oxide and ytterbium oxide, and at least one member selected from manganese oxide, cobalt oxide and nickel oxide, with the principal component being represented by the compositional formula

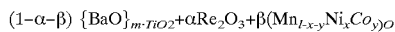

where $Re_2O_3$ is at least one of $Y_2O_3$, $Tb_2O_3$, $Dy_2O_3$, $Ho_2O_3$, $Er_2O_3$, and $Yb_2O_3$; and α, β, m, x, and y are defined as follows.

$0.0025 \leq \alpha \leq 0.025$ $0.0025 \leq \beta \leq 0.05$ $\beta/\alpha \leq 4$ $0 \leq x < 1.0$ $0 \leq y < 1.0$ $0 \leq x+y < 1.0$ $1.000 < m \leq 1.035$, said dielectric ceramic layers containing as a secondary component magnesium oxide in an amount of about 0.1–3.0 mol in terms of MgO for 100 mols of said principal component, and said multilayer ceramic capacitor containing about 0.2–3.0 parts by weight of oxide glass of the $Al_2O_3$—MO—$B_2O_3$ type (where MO is an oxide of at least one of BaO, CaO, SrO, MgO, ZnO, and MnO) for 100 parts by weight of the total amount of said principal component and said magnesium oxide, and said internal electrodes are made of nickel or nickel alloy.

Preferably, $0.003 \leq \alpha \leq 0.0125$, $0.004 \leq \beta \leq 0.024$, $\beta/\alpha \leq 1.2$, $0.1 \leq x < 0.9$, $0.2 \leq y < 0.9$, $5 \leq x+y < 0.9$, $1.005 < m \leq 1.015$, and about 0.5–2 mols MgO per 100 mols of principal component and about 0.8–2 parts of oxide glass per 100 parts of principal component.

The second aspect of the present invention resides in the multilayer ceramic capacitor wherein said oxide glass of $Al_2O_3$—MO—$B_2O_3$ type (where MO is an oxide of at least one of BaO, CaO, SrO, MgO, ZnO, and MnO) has a composition (in mol %) defined by the region on and within six straight lines joining six points defined as follows in a $\{Al_2O_3$—MO—$B_2O_3\}$ phase diagram:

A (1, 14, 85)

B (20, 10, 70)

C (30, 20, 50)

D (40, 50, 10)

E (20, 70, 10)

F (1, 39, 60).

The third aspect of the present invention resides in the multilayer ceramic capacitor wherein said external electrodes are constructed of sintered layers of electrically conductive metal powder with or without glass frit incorporated therein.

The fourth aspect of the present invention resides in the multilayer ceramic capacitor wherein said external electrodes are constructed of a first layer and a second layer formed thereon, said first layer being a sintered layer of electrically conductive metal powder with or without glass frit incorporated therein, and said second layer being a plated layer.

The fifth aspect of the present invention resides in a ceramic composition which comprises barium titanate containing about 0.02 wt%. and less of alkali metal oxide as an impurity, at least one of yttrium oxide, terbium oxide, dysprosium oxide, holmium oxide, erbium oxide and ytterbium oxide, and at least one of manganese oxide, cobalt oxide and nickel oxide, with the principal component being represented by the compositional formula

where $Re_2O_3$ is at least one of $Y_2O_3$, $Tb_2O_3$, $Dy_2O_3$, $Ho_2O_3$, $Er_2O_3$, and $Yb_2O_3$; and α, β, m, x, and y are defined as follows.

$0.0025 \leq \alpha \leq 0.025$ $0.0025 \leq \beta \leq 0.05$ $\beta/\alpha \leq 4$ $0 \leq x < 1.0$ $0 \leq y < 1.0$ $0 \leq x+y < 1.0$ $1.000 < m \leq 1.035$, said dielectric ceramic layers containing as a secondary component magnesium oxide in an amount of about 0.1–3.0 mol in terms of MgO for 100 mol of said principal component, and about 0.2–3.0 parts by weight of oxide glass of $Al_2O_3$-MO-$B_2O_3$ type (where MO is an oxide of at least one of BaO, CaO, SrO, MgO, ZnO, and MnO) for 100 parts by weight of the total amount of said principal component and said magnesium oxide.

The sixth aspect of the present invention resides in the ceramic composition mentioned above wherein said oxide glass of $Al_2O_3$—MO—$B_2O_3$ type (where MO is an oxide of at least one of BaO, CaO, SrO, MgO, ZnO, and MnO) has a composition (in mol %) defined by the region on and within six straight lines joining six points defined as follows in a $\{Al_2O_3$—MO—$B_2O_3\}$ phase diagram:

A (1, 14, 85)

B (20, 10, 70)

C (30, 20, 50)

D (40, 50, 10)

E (20, 70, 10)

F (1, 39, 60).

The following is the description of the embodiments of the present invention.

The multilayer ceramic capacitor of the present invention is characterized in that the dielectric ceramic layer is made from barium titanate, at least one rare earth oxide selected from yttrium oxide, terbium oxide, dysprosium oxide, holmium oxide, erbium oxide and ytterbium oxide, at least one kind of oxide selected from manganese oxide, cobalt oxide and nickel oxide, and at least one oxide glass of the $Al_2O_3$—MO—$B_2O_3$ type (where MO is at least one of Bao, CaO, SrO, MgO, ZnO, and MnO). This dielectric ceramic material can be fired in a reducing atmosphere without deterioration in its characteristic properties. The resulting multilayer ceramic capacitor has an electrostatic capacity whose temperature characteristics satisfy requirement B provided in the JIS standards and requirement X7R provided in the EIA standards. It also has a high insulation resistance at room temperature and high temperatures in a strong electric field. Hence it offers high reliability.

The dielectric ceramic layer is composed of crystal grains smaller than about 1 $\mu$m in diameter. It therefore follows that more crystal grains can exist in any one dielectric ceramic layer. This makes it possible to reduce the thickness of the dielectric layer of the multilayer ceramic capacitor without decreasing in reliability.

As mentioned above, the dielectric ceramic layer is made of a dielectric ceramic material composed mainly of barium titanate, at least one rare earth oxide selected from yttrium oxide, terbium oxide, dysprosium oxide, holmium oxide, erbium oxide and ytterbium oxide, and at least one kind of manganese oxide, cobalt oxide and nickel oxide. It was found that the electrical properties of the multilayer ceramic capacitor are greatly affected by the content of impurities in the barium titanate. Such impurities include alkaline earth metal oxides such as SrO and CaO, alkali metal oxides such as $Na_2O$ and $K_2O$, and other oxides such as $Al_2O_3$ and $SiO_2$. Of these impurities, the alkali metal oxides are the most influential. In other words, it was found that a permittivity 3000 or higher can be achieved by using barium titanate containing less than about 0.02 wt %, preferably less than about 0.012 wt %, of alkali metal oxide as an impurity.

It was also found that incorporating oxide glass composed mainly of $Al_2O_3$—MO—$B_2O_3$ (where MO is an oxide of at least one of BaO, CaO, SrO, MgO, ZnO, and MnO), the dielectric ceramic layer improves both sinterability and plating resistance.

The above-specified dielectric ceramic material can be made into dielectric ceramic layers for a highly reliable, small-size, large-capacity multilayer ceramic capacitor which is suitable for surface mounting and is less liable to change in electrostatic capacity with temperature. Moreover, the multilayer ceramic capacitor may have internal electrodes made of nickel or nickel alloy, containing or not containing a small amount of ceramic powder.

The external electrode is not specifically restricted in composition. It may be formed in layer form by sintering from electrically conductive metal powder of Ag, Pd, Ag-Pd, Cu, Cu alloy, etc. The metal powder may be combined with glass frit of $B_2O_3$—$Li_2O$—$SiO_2$—BaO, $B_2O_3$—$SiO_2$—BaO, $B_2O_3$—$SiO_2$-ZnO, $Li_2O$—$SiO_2$—BaO, etc. The metal powder may also be combined with a small amount of ceramic powder in addition to glass frit. The sintered layer of external electrode should preferably be coated with a plated layer of Ni, Cu, Ni-Cu alloy, etc., which may be further coated with a plated layer of solder, tin, etc.

The invention will be described in more detail with reference to the following examples, which are not intended to restrict the scope of the invention.

Figure 2:
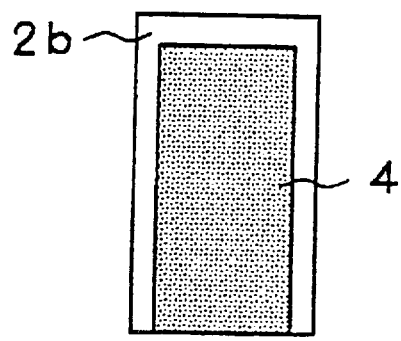
FIG. 2 is a schematic plan view of the dielectric ceramic layer provided with an internal electrode.
Figure 3:
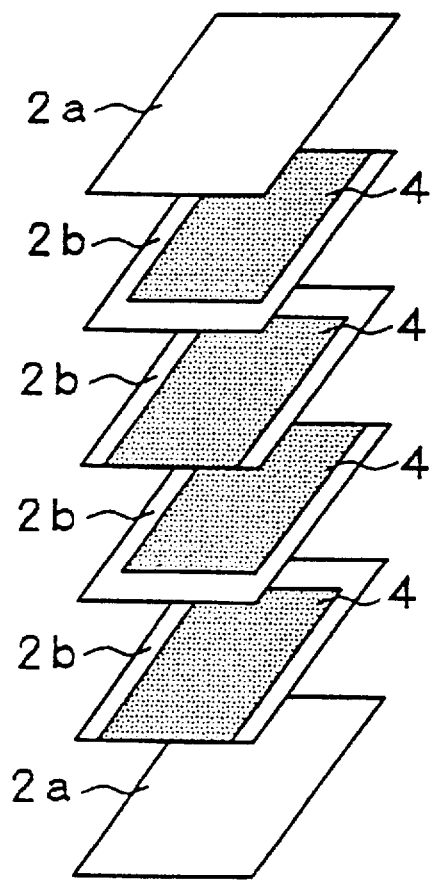
FIG. 3 is an exploded perspective view of the stack of ceramic layers.

The present invention is embodied in a multilayer ceramic capacitor as illustrated in the accompanying drawing. FIG. 1 is a schematic sectional view showing the multilayer ceramic capacitor. FIG. 2 is a schematic plan view showing a dielectric ceramic layer provided with an internal electrode. FIG. 3 is an exploded perspective view showing a stack of ceramic layers.

As FIG. 1 shows, the multilayer ceramic capacitor 1 can be of rectangular parallelepipedic chip type 1, which consists of a ceramic layer assembly 3 (which is formed by stacking a plurality of dielectric ceramic layers 2a, 2b, with an internal electrode 4 interposed between them), external electrode layers 5, a first plated layer 6 of copper or the like and a second plated layer 7 of tin or the like both formed consecutively on the external electrode 5.

The following is the step-by-step process for producing the multilayer ceramic capacitor pertaining to the present invention.

First, the ceramic layer assembly 3 is formed in the following manner. A slurry of raw material powder is prepared from barium titanate, at least one rare earth metal selected from yttrium oxide, terbium oxide, dysprosium oxide, holmium oxide, erbium oxide and ytterbium oxide, and at least one of manganese oxide, cobalt oxide and nickel oxide, magnesium oxide, and oxide glass composed mainly of $Al_2O_3$—MO—$B_3O_3$ (where MO is at least one of BaO, CaO, SrO, MgO, ZnO, and MnO). This slurry is made into a dielectric ceramic layer 2 (green sheet). On one side of the green sheet is formed an internal electrode 4 of nickel or nickel alloy by screen printing or vapor deposition or plating. Thee resulting sleet is shown in FIG. 2.

Second, as many pieces of the dielectric ceramic layers 2b (provided with the internal electrode 4) as necessary are stacked and pressed between two pieces of the dielectric ceramic layers 2a (not provided with the internal electrode 4), as shown in FIG. 3. The stack of the dielectric ceramic layers 2a, 2b, ..., 2b, 2a is subsequently fired in a reducing atmosphere at a prescribed temperature. Thus there is obtained the ceramic layer assembly 3.

Third, on the end faces of the ceramic layer assembly 3 are formed two external electrodes 5 in such a manner that they communicate with the internal electrodes 4.

The external electrode 5 may be formed from the same material as used for the internal electrode 4. It may also be formed from silver, palladium, silver-palladium alloy, copper, copper alloy, or the like in powder form. This metal powder may be combined with glass frit of $B_2O_3$—$SiO_2$—BaO, $Li_2O$-$SiO_2$-BaO or the like. The material should be selected according to how and where the multilayer ceramic capacitor is used.

The external electrode 5 is formed from a paste of electrically conductive metal powder by sintering after application onto the ceramic layer assembly 3 which has been fired. Alternatively, it may be formed by applying an electrically conductive paste onto the ceramic layer assembly 3 prior to firing and firing the paste simultaneously with the ceramic layer assembly 3. Subsequently, the external electrode 5 is coated with a first plated layer 6 by plating with nickel, copper or the like. Finally, the first plated layer 6 is further coated with a second plated layer 7 by plating with tin or the like. In this way there is obtained the multilayer ceramic capacitor 1 of chip type.

The invention will be described in more detail with reference to the following examples.

EXAMPLE 1

Several grades of $TiCl_4$ and $Ba(NO_3)_2$ as starting materials varying in purity content were weighed. They were reacted with oxalic acid to give a precipitate of titanium barium oxalate ($BaTiO(C_2O_4)\cdot 4H_2O$). This precipitate was pyrolyzed at 1000° C. and above. Thus there were obtained four species of barium titanate ($BaTiO_3$) as shown in Table 1.

TABLE 1

| Species of $BaTiO_3$ | Content of impurities (wt %) | | | | | Average particle diameter (μm) |
| --- | --- | --- | --- | --- | --- | --- |
| | Alkali metal oxide | SrO | CaO | $SiO_2$ | $Al_2O_3$ | |
| A | 0.003 | 0.012 | 0.001 | 0.010 | 0.005 | 0.60 |
| B | 0.030 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Components in the form of oxide, carbonate, or hydroxide was weighed according to the composition of $0.25Al_2O_3$-$0.17BaO$-$0.03MnO$-$0.55B_2O_3$ (molar ratio). The weighed materials were mixed, crushed, and dried to give a powder. This powder was heated and melted at 1400° C. in a platinum crucible. After quenching and crushing, there was obtained a powder of oxide glass having an average particle diameter not larger than 1 μm.

The following raw material powders were made ready.

$BaCO_3$ to adjust the Ba/Ti molar ratio (m) of barium titanate.

$Y_2O_3$, $Tb_2O_3$, $Dy_2O_3$, $Ho_2O_3$, $Er_2O_3$, $Yb_2O_3$, MnO, NiO, CoO and MgO, each having a purity not lower than 99%.

They were mixed with the above-mentioned oxide glass powder in varied ratios according to compositions shown in Table 2.

TABLE 2

$(1-\alpha-\beta)\{BaO\}_m \cdot TiO_2 + \alpha Re_2O_3 + \beta(Mn_{1-x-y}Ni_xCo_y)O$

| Sample No. | Species of $BaTiO_3$ | Re | | | | | α | β | x | y | β/α | m | MgO (mol) | Oxide glass (pbw) |
| --- | --- | --- | --- | --- | --- | --- | --- | --- | --- | --- | --- | --- | --- | --- |
| | | Y | Tb | Dy | Ho | Er | Yb | | | | | | | |
| 1* | A | — | — | — | — | — | — | — | 0.0100 | 0.4 | 0.4 | — | 1.010 | 1.00 | 0.80 |
| 2* | A | — | — | 0.010 | — | 0.0025 | — | 0.0125 | — | — | — | — | 1.010 | 1.00 | 0.80 |
| 3* | A | — | — | 0.010 | — | 0.0025 | — | 0.0125 | 0.0100 | 0.4 | 0.4 | 4/5 | 0.990 | 1.00 | 0.80 |
| 4* | A | 0.0125 | — | — | — | — | — | 0.0125 | 0.0100 | 0.4 | 0.4 | 4/5 | 1.000 | 1.00 | 0.80 |
| 5* | A | — | 0.0075 | 0.0050 | — | — | — | 0.0125 | 0.0125 | 0.4 | 0.4 | 1 | 1.010 | — | 0.80 |
| 6* | A | — | — | 0.010 | — | — | — | 0.0100 | 0.0100 | 0.4 | 0.4 | 1 | 1.010 | 1.00 | — |
| 7 | A | — | — | 0.0025 | — | — | — | 0.0025 | 0.0025 | 0.3 | 0.2 | 1 | 1.005 | 0.50 | 0.20 |
| 8 | A | — | 0.0050 | 0.0050 | — | — | — | 0.0100 | 0.0120 | 0.3 | 0.2 | 6/5 | 1.010 | 1.00 | 0.80 |
| 9 | A | — | 0.0075 | — | — | — | 0.0050 | 0.0125 | 0.0075 | — | 0.9 | 3/5 | 1.010 | 2.00 | 0.80 |
| 10 | A | 0.0010 | — | 0.0080 | — | — | — | 0.0090 | 0.0100 | 0.2 | 0.6 | 10/9 | 1.015 | 1.50 | 1.00 |
| 11 | A | 0.0040 | — | 0.0040 | — | — | — | 0.0080 | 0.0080 | 0.9 | — | 1 | 1.010 | 1.50 | 1.00 |
| 12 | C | — | — | 0.0150 | 0.0100 | — | — | 0.0250 | 0.0500 | 0.5 | 0.4 | 2 | 1.005 | 1.00 | 2.00 |
| 13 | B | — | 0.0030 | — | — | — | — | 0.0030 | 0.0030 | 0.4 | 0.5 | 1 | 1.010 | 3.00 | 3.00 |
| 14 | A | — | — | 0.0100 | — | — | — | 0.0100 | 0.0050 | — | — | 1/2 | 1.010 | 1.00 | 1.00 |
| 15 | A | 0.0040 | — | 0.0020 | — | — | — | 0.0060 | 0.0240 | 0.4 | 0.4 | 4 | 1.035 | 0.10 | 1.50 |
| 16 | A | — | — | 0.0080 | — | 0.0120 | — | 0.0200 | 0.0040 | 0.2 | 0.4 | 1/5 | 1.015 | 2.00 | 1.00 |
| 17* | A | — | — | — | 0.0100 | — | 0.0200 | 0.0300 | 0.0150 | 0.4 | 0.4 | 1/2 | 1.010 | 2.00 | 1.00 |
| 18* | A | — | — | 0.0100 | 0.0100 | — | — | 0.0200 | 0.0800 | 0.4 | 0.4 | 4 | 1.010 | 1.00 | 0.80 |
| 19* | A | — | — | 0.0100 | — | — | — | 0.0100 | 0.0100 | 1.0 | — | 1 | 1.010 | 1.00 | 0.80 |
| 20* | A | 0.0100 | — | — | — | — | — | 0.0100 | 0.0100 | — | 1.0 | 1 | 1.010 | 1.00 | 0.80 |
| 21* | A | — | — | 0.0050 | — | — | — | 0.0050 | 0.0500 | 0.3 | 0.3 | 10 | 1.010 | 1.00 | 0.80 |
| 22* | A | 0.0100 | — | — | — | — | — | 0.0100 | 0.0050 | 0.3 | 0.3 | 1/2 | 1.010 | 1.00 | 1.00 |
| 23* | A | 0.0100 | — | — | — | — | — | 0.0100 | 0.0050 | 0.3 | 0.3 | 1/2 | 1.010 | 5.00 | 1.50 |
| 24* | A | — | — | — | 0.0100 | — | — | 0.0100 | 0.0050 | 0.3 | 0.3 | 1/2 | 1.010 | 1.00 | 5.00 |
| 25* | D | — | — | 0.0100 | — | — | — | 0.0100 | 0.0050 | 0.3 | 0.3 | 1/2 | 1.010 | 1.00 | 0.80 |

*Asterisked samples are outside the scope of the present invention.

The resulting compound was mixed by ball milling with a binder (such as polyvinyl butyral) and an organic solvent (such as ethanol) to give a ceramic slurry. This ceramic slurry was formed into a sheet by the doctor blade process. Thus there was obtained a rectangular green sheet, 11 μm thick. A Ni-based electrically conductive paste was applied to the green sheet by printing to form a layer of electrically conductive paste, which was subsequently converted into the internal electrode.

A plurality of the green sheets were stacked so that the paste layers of successive green sheets were exposed alternately at opposite end-faces. Thus there was obtained a stacked assembly. This stacked assembly was heated at 350° C. in a nitrogen atmosphere to burn the binder. Then it was fired for 2 hours at varied temperatures shown in Table 3 in a reducing atmosphere composed of $H_2$-$N_2$-$H_2O$ gas, with the oxygen partial pressure being $10^{-9}$ to $10^{-12}$ MPa. Thus there was obtained a ceramic sintered body.

The surface of the ceramic sintered body was examined under a scanning electron microscope (x1500) to measure the grain size.

After firing, both end-faces of the sintered body were coated with a silver paste containing $B_2O_3$-$Li_2O$—$SiO_2$—BaO glass frit. The silver paste was baked at 600° C. in a nitrogen atmosphere to form the external electrode which electrically communicated with the internal electrodes.

The thus obtained multilayer ceramic capacitor was 1.6 mm wide, 3.2 mm long, and 1.2 mm thick (in outside measurements), and the dielectric ceramic layer between internal electrodes was 8 μm thick.

The total number of the effective dielectric ceramic layers was 19, and the area per layer of the opposite electrodes was 2.1 mm².

The samples of the multilayer ceramic capacitor were tested for electrical properties. Electrostatic capacity (C) and dielectric loss (tan δ) were measured at 1 kHz frequency, 1 $V_{rms}$, and 25° C. by using an automatic bridge-type meter, and permittivity (ε) was calculated from the electrostatic capacity.

Insulation resistance (R) was measured at 25° C. and 125° C. by application of 16 V dc voltage for 2 minutes, by using an insulation resistance meter. The product (CR) of electrostatic capacity (C) and insulation resistance (R) was obtained.

Insulation resistance (R) in an electric field of 20 kV/mm was measured at 25° C. and 125° C. by application of 160 V dc voltage for 2 minutes, and the product (CR) was obtained.

The rate of change with temperature in electrostatic capacity was measured. The results are expressed in terms of ΔC/20° C., ΔC/25° C. The first is the rate of change at −25° C. and 85° C. compared with the value at 20° C. The second is the rate of change at −55° C. and 125° C. or the absolute value of the maximum rate of change in the range of −55° C. to 125° C. compared with the value at 25° C.

In addition, samples of the multilayer ceramic capacitors were tested for high-temperature load life. The test consists of applying a 100 V dc voltage to 36 specimens at 150° C., and measuring the change with time in insulation resistance. The time required for each specimen to decrease in insulation resistance (R) below $10^6$ Ω is regarded as the average life time of the specimen.

The results of the above-mentioned measurements shown in Table 3.

TABLE 3

| Sample No. | Firing temperature (°C.) | Permittivity (ε) | Dielectric loss tan δ (%) | Rate of change in capacity with temperature (%) ΔC/20° C. −25° C. | 85° C. | ΔC/25° C. −55° C. | 125° C. | max | Product of CR (MΩ · μF) applied at 2.0 kV/mm 25° C. | 125° C. | applied at 20 kV/mm 25° C. | 125° C. | Average life time (h) | Grain size (μm) |
|---|---|---|---|---|---|---|---|---|---|---|---|---|---|---|
| 1* | 1280 | 2790 | 2.5 | −11.3 | −2.5 | −16.2 | −4.2 | 16.2 | 8220 | 1670 | 6750 | 270 | 6 | 0.87 |
| 2* | 1280 | | | Unable to measure due to change into semiconductor | | | | | | | | | | 2.2 |
| 3* | 1280 | | | Unable to measure due to change into semiconductor | | | | | | | | | | 1.9 |
| 4* | 1280 | 3390 | 2.0 | −2.6 | −5.9 | −2.8 | −7.2 | 7.2 | 4350 | 670 | 590 | 90 | 123 | 0.73 |
| 5* | 1280 | 3370 | 1.9 | −0.8 | −9.8 | −0.2 | −16.1 | 16.1 | 6270 | 2090 | 1720 | 150 | 396 | 0.77 |
| 6 | 1360 | | 0.61 | | | | | | | | | | | |
| 7 | 1300 | 4100 | 2.5 | −5.7 | −7.0 | −9.8 | −13.3 | 13.3 | 7550 | 5250 | 4810 | 550 | 519 | 0.71 |
| 8 | 1280 | 3420 | 2.0 | −1.8 | −5.7 | −2.0 | −7.4 | 7.6 | 6470 | 2880 | 2920 | 630 | 626 | 0.70 |
| 9 | 1300 | 3140 | 1.7 | −0.8 | −7.6 | −1.0 | −8.9 | 8.9 | 6230 | 3030 | 2580 | 790 | 642 | 0.69 |
| 10 | 1280 | 3430 | 1.9 | −0.7 | −6.8 | −1.1 | −7.7 | 8.0 | 6400 | 3110 | 2690 | 770 | 677 | 0.70 |
| 11 | 1280 | 3490 | 1.8 | −0.9 | −6.2 | −1.0 | −7.4 | 7.4 | 6260 | 2580 | 2130 | 590 | 578 | 0.71 |
| 12 | 1300 | 3030 | 1.6 | −2.4 | −5.0 | −2.5 | −5.3 | 5.4 | 6070 | 2780 | 2600 | 770 | 608 | 0.79 |
| 13 | 1260 | 3450 | 2.3 | −5.5 | −6.3 | −8.2 | −12.4 | 12.4 | 6970 | 4320 | 3980 | 570 | 536 | 0.61 |
| 14 | 1280 | 3270 | 1.8 | −0.7 | −6.9 | −1.2 | −7.8 | 7.8 | 6460 | 2650 | 2680 | 860 | 740 | 0.69 |
| 15 | 1300 | 3190 | 1.8 | −2.5 | −5.9 | −2.7 | −6.6 | 6.7 | 6670 | 2190 | 3030 | 600 | 565 | 0.67 |
| 16 | 1300 | 3090 | 1.6 | −1.8 | −5.2 | −2.1 | −4.9 | 5.5 | 6040 | 2080 | 2060 | 670 | 659 | 0.68 |
| 17* | 1360 | 2280 | 1.9 | −2.0 | −5.2 | −2.3 | −3.8 | 5.6 | 2560 | 850 | 890 | 260 | 279 | 0.64 |
| 18* | 1360 | 3050 | 2.0 | −0.7 | −9.8 | −0.2 | −17.2 | 17.2 | 5410 | 390 | 2440 | 90 | 55 | 0.69 |
| 19* | 1280 | 3440 | 1.9 | −1.7 | −5.9 | −1.0 | −7.3 | 7.3 | 2550 | 200 | 1000 | 110 | 114 | 0.73 |
| 20* | 1280 | 3270 | 1.7 | −2.3 | −5.0 | −1.5 | −5.4 | 5.6 | 3490 | 280 | 1030 | 140 | 162 | 0.73 |
| 21* | 1280 | 3580 | 2.2 | 0.8 | −11.5 | −0.7 | −18.0 | 18.0 | 6490 | 1770 | 2980 | 290 | 309 | 0.74 |
| 22* | 1360 | | | Unable to measure due to incomplete sintering | | | | | | | | | | 0.61 |
| 23* | 1360 | 2140 | 1.5 | −2.0 | −3.1 | −2.9 | 3.6 | 3.9 | 6160 | 2180 | 3030 | 560 | 430 | 0.64 |
| 24* | 1200 | 1940 | 1.3 | −1.2 | −2.3 | −1.3 | 5.6 | 5.2 | 5200 | 3370 | 3650 | 1830 | 482 | 0.69 |
| 25* | 1280 | 2600 | 1.5 | −2.1 | −5.0 | −2.3 | −6.8 | 6.8 | 7120 | 2980 | 3630 | 642 | 675 | 0.67 |

*Asterisked samples are outside the scope of the present invention.

It is apparent from Tables 1 to 3 that the multilayer ceramic capacitor pertaining to the present invention is characterized by a permittivity higher than 3000, a dielectric loss lower than 2.5%, and a small rate of change with temperature in electrostatic capacity which meets requirement B provided in the JIS standards in the range of −25° C.

to 85° C. and also meets requirement X7R provided in the EIA standards within the range of −55° C. to 125° C.

It is also characterized by an insulation resistance (in terms of product of CR) higher than 2000 MΩ·μF and 500 MΩ·μF at 25° C. and 125° C., respectively, with the electric field strength being 20 kV/mm.

It is further characterized by an average life time longer than 500 hours.

It is also characterized by the ability to be sintered at a comparatively low temperature not exceeding 1300° C. and by a small grain size not exceeding 1 μm.

The multilayer ceramic capacitor pertaining to the present invention is made from a dielectric ceramic material of the specific composition.

where $Re_2O_3$ is at least one of $Y_2O_3$, $Tb_2O_3$, $Dy_2O_3$, $Ho_2O_3$, $Er_2O_3$ and $Yb_2O_3$.

The composition with an amount (α) of $Re_2O_3$ less than about 0.0025 leads to a permittivity not higher than 3000, a great rate of change with temperature in electrostatic capacity, a low insulation resistance at 125° C. regardless of electric field strength, and an extremely short average life time, as demonstrated in sample No. 1.

The composition with an amount (α) of $Re_2O_3$ exceeding about 0.025 leads to a permittivity not higher than 3000, a low insulation resistance at 25° C. and 125° C., a short average life time, and a high sintering temperature, as demonstrated in sample No. 17.

The composition with an amount (β) of (Mn, Ni, Co)O less than about 0.0025 leads to a low insulation resistance which results from the dielectric ceramic being reduced into a semiconductor during firing in a reducing atmosphere, as demonstrated in sample No. 2.

The composition with an amount (β) of (Mn, Ni, Co)O exceeding about 0.05 leads to a low insulation resistance at 125° C. regardless of electric field strength, a short average life time, and a great rate of change with temperature in electrostatic capacity (which does not meet the X7R requirement provided in the EIA standards), as demonstrated in sample No. 18.

The composition with an amount (x) of NiO or an amount (y) of CoO equal to 1 leads to a low insulation resistance at 125° C. and 2.0 kV/mm and an insulation resistance at 20 kV/mm which does not meet 2000 MΩ·μF and 500 MΩ·μF at 25° C. and 125° C., respectively, and an average life time shorter than 500 hours, as demonstrated in sample Nos. 19 and 20.

The composition with an amount (α) of $Re_2O_3$ and an amount (β) of (Mn, Ni, Co)O such that the ratio of β/α is 4 and above lead to a great rate of change with temperature in electrostatic capacity, a low insulation resistance at 125° C. which does not meet 2000 MΩ·μF and 500 MΩ·μF at 2.0 kV/mm and 20 kV/mm, respectively, and an average life time shorter than 500 hours, as demonstrated in sample No. 21.

The composition with a molar ratio (m) of barium titanate equal to or less than about 1.000 leads to a low insulation resistance due to conversion into semiconductor during firing in a reducing atmosphere, a low insulation resistance at high temperatures and high electric field strength and an extremely short life time, as demonstrated in sample Nos. 3 and 4.

The composition with a molar ratio (m) exceeding about 1.035 leads to extremely poor sinterability, as demonstrated in sample No. 22.

The composition with an amount of MgO less than about 0.1 mol leads to a low insulation resistance at 20 kV/mm, an average life time shorter than 500 hours and a great rate of change with temperature in electrostatic capacity (which meets the B requirement provided in the JIS standards but does not meet the X7R requirement provided in the EIA standards), as demonstrated in sample No. 5.

The composition with an amount of MgO in excess of about 3.0 mol leads to a high sintering temperature, a permittivity lower than 3000 and an average life time shorter than 500 hours, as demonstrated in sample No. 23.

The composition with an amount of oxide glass ($Al_2O_3$-$MO$-$B_2O_3$) less than about 0.2 part by weight leads to incomplete sintering, as demonstrated in sample No. 6.

The composition with an amount of oxide glass ($Al_2O_3$-$MO$-$B_2O_3$) in excess of about 3.0 parts by weight leads to a permittivity lower than 3000, as demonstrated in sample No. 24.

The composition with an amount of alkali metal oxide (as an impurity in barium titanate) in excess of about 0.02 part by weight leads to a low permittivity as demonstrated in sample No. 25.

EXAMPLE 2

A mixture composed of the following components $98.0\{BaO\}_{1.010} \cdot TiO_2 + 0.9 Dy_2O_3 + 0.1 Er_2O_3 + 1.0 (Mn_{0.3}Ni_{0.7})O$ (in molar ratio) was prepared from barium titanate A shown in Table 1 and other oxides.

To this mixture was added MgO in an amount of 1.2 mol.

The resulting mixture was combined with the $Al_2O_3$-$MO$-$B_2O_3$ oxide glass having an average particle diameter not larger than 1 μm as shown in Table 4 which was prepared by heating at 1300°–1500° C. in the same manner as in Example 1. The thus obtained dielectric ceramic material was made into multilayer ceramic capacitors (having silver external electrodes electrically connected to internal electrodes) in the same manner as in Example 1. They have the same dimensions as those in Example 1.

The resulting samples were tested for electrical properties. Electrostatic capacity (C) and dielectric loss (tan δ) were measured at 1 kHz frequency, 1 $V_{rms}$, and 25° C. by using an automatic bridge-type meter, and permittivity (ε) was calculated from the electrostatic capacity. Insulation resistance (R) was measured at 25° C. and 125° C. by application of a 160 V dc voltage for 2 minutes, by using an insulation resistance meter. The product (CR) of electrostatic capacity (C) and insulation resistance (R) was obtained.

The rate of change with temperature in electrostatic capacity was measured. The results are expressed in terms of ΔC/20° C. and ΔC/25° C. in the same manner as Example 1.

TABLE 4

| Oxide glass | Components of oxide glass (mol %) | | | | | | | | |
|---|---|---|---|---|---|---|---|---|---|
| | | | | M | | | | | |
| (wt %) | $Al_2O_3$ | Ba | Ca | Sr | Mg | Zn | Mn | MO | $B_2O_3$ |
| 26 1.0 | 1 | 5 | 5 | — | — | — | 4 | 14 | 85 |
| 27 1.0 | 20 | 8 | — | — | — | 2 | — | 10 | 70 |
| 28 1.0 | 30 | 6 | 10 | 2 | 2 | — | — | 20 | 50 |
| 29 1.0 | 40 | — | 30 | — | — | 5 | 15 | 50 | 10 |
| 30 1.0 | 20 | — | 30 | — | — | 10 | 30 | 70 | 10 |
| 31 1.0 | 1 | — | 5 | 5 | 24 | 5 | — | 39 | 60 |
| 32 1.0 | 15 | 10 | — | — | — | 3 | 2 | 15 | 70 |
| 33 1.0 | 10 | 10 | 15 | — | 5 | — | 5 | 35 | 55 |
| 34 1.0 | 20 | — | 30 | 5 | — | 3 | 2 | 40 | 40 |
| 35 1.0 | 30 | 5 | 35 | 5 | — | 5 | — | 50 | 20 |

TABLE 4-continued

| Oxide glass (wt %) | Components of oxide glass (mol %) | | | | | | | | |
|---|---|---|---|---|---|---|---|---|---|
| | $Al_2O_3$ | M | | | | | | MO | $B_2O_3$ |
| | | Ba | Ca | Sr | Mg | Zn | Mn | | |
| 36* | 1.0 | 10 | 5 | — | — | — | — | 5 | 85 |
| 37* | 1.0 | 30 | 5 | 5 | — | — | — | 10 | 60 |
| 38* | 1.0 | 40 | 20 | — | — | 3 | 2 | 25 | 35 |
| 39* | 1.0 | 60 | 30 | — | — | 3 | 2 | 35 | 5 |
| 40* | 1.0 | 5 | 15 | 35 | 10 | 3 | 2 | 65 | 30 |
| 41* | 1.0 | — | 15 | 15 | — | — | — | 30 | 70 |

*Asterisked samples are outside the scope of the present invention

After the above-mentioned measurements, the silver external electrode was plated with nickel by the barrel plating process in a plating solution containing nickel sulfate, nickel chloride and boric acid.

Finally, the nickel-plated film underwent tinlead plating with an alkanol-sulfonic acid solution by the barrel plating process. Thus there were obtained samples of multilayer ceramic capacitors having external electrodes coated with plated film.

The thus obtained multilayer ceramic capacitors were tested for electrical properties. Electrostatic capacity (C) was measured at 1 kHz, 1 $V_{rms}$, and 25° C. by using an automatic bridge-type meter. Insulation resistance (R) at an electric field strength of 20 kV/mm was measured at 25° C. and 125° C. by application of a 160 V dc voltage for 2 minutes. The value of CR was obtained.

The results are shown in Table 5.

Figure 4:
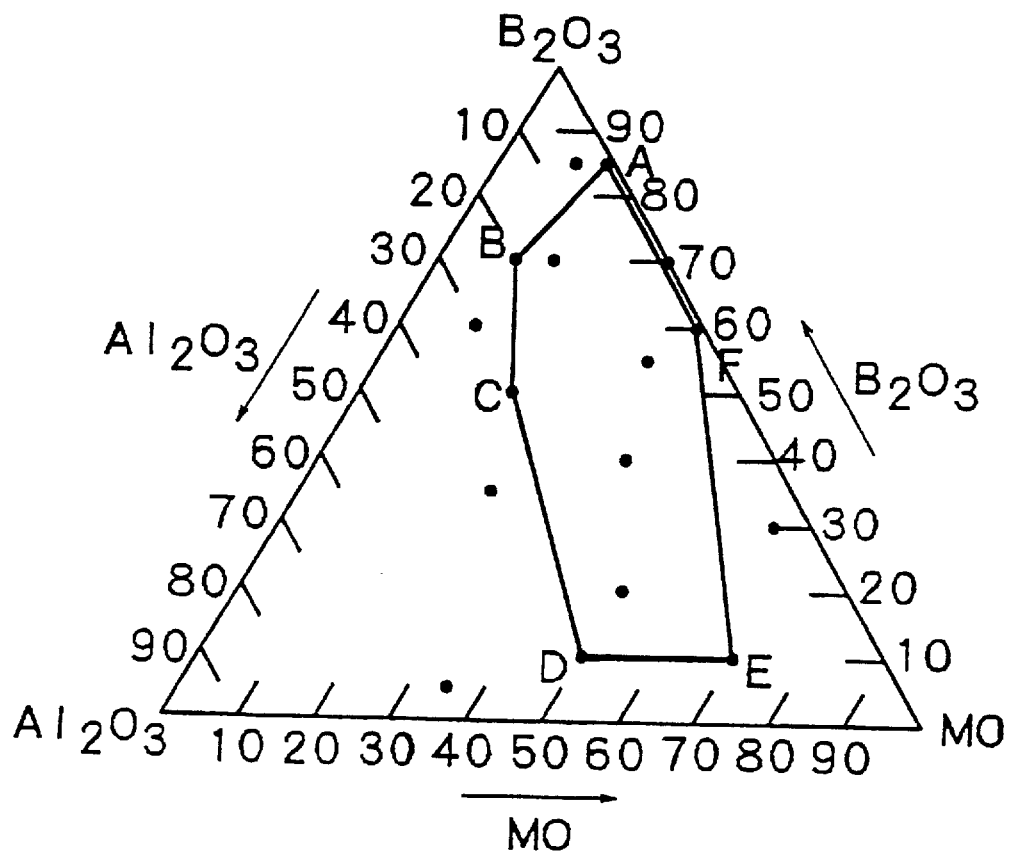
FIG. 4 is a trilinear chart defining the composition ($Al_2O_3$, MO, $B_2O_3$) of the oxide glass of $Al_2O_3$—MO—$B_2O_3$ type.

The oxide glass used in the multilayer ceramic capacitor pertaining to the present invention has the specific composition $Al_2O_3$-MO-$B_2O_3$ (where MO is least one of BaO, CaO, SrO, MgO, ZnO and MnO), with each amount of $Al_2O_3$, MO, and $B_2O_3$ being specified by the trilinear chart shown in FIG. 4.

Samples are poor in sinterability or decrease extremely in insulation resistance after plating although sinterable, as demonstrated by Nos. 36 to 41, if the composition of the oxide glass is outside the region specified by six lines joining six points each corresponding to the amount of components as follows.

Point A: $Al_2O_3$ 1 mol %, MO 14 mol %, $B_2O_3$ 85 mol %.

Point B: $Al_2O_3$ 20 mol %, MO 10 mol %, $B_2O_3$ 70 mol %.

Point C: $Al_2O_3$ 30 mol %, MO 20 mol %, $B_2O_3$ 50 mol %.

Point D: $Al_2O_3$ 40 mol %, MO 50 mol %, $B_2O_3$ 10 mol %.

Point E: $Al_2O_3$ 20 mol %, MO 70 mol %, $B_2O_3$ 10 mol %.

Point F: $Al_2O_3$ 1 mol %, MO 39 mol %, $B_2O_3$ 60 mol %.

Incidentally, the above-mentioned examples employed barium titanate powder prepared by the oxalic acid process; however, it may be replaced by one which is prepared by the alkoxide process or the hydrothermal synthesis. In these cases, the resulting products could be superior in characteristic properties to those in the above-mentioned examples.

In the above-mentioned examples, the dielectric ceramic material was prepared from oxide powders (such as yttrium oxide, terbium oxide, dysprosium oxide, holmium oxide,

TABLE 5

| Sample No. | Firing temperature (°C.) | Dielectric Permittivity ($\epsilon$) | loss tan δ (%) | Rate of change in capacity with temperature (%) | | | | | CR product (at 20 kV/mm) MΩ · μF | | | |
|---|---|---|---|---|---|---|---|---|---|---|---|---|
| | | | | ΔC/20° C. | | ΔC/25° C. | | | before plating | | after plating | |
| | | | | -25° C. | 85° C. | -55° C. | 125° C. | max | 25° C. | 125° C. | 25° C. | 125° C. |
| 26 | 1260 | 3090 | 1.7 | -1.0 | -6.6 | -1.5 | -7.4 | 7.5 | 2650 | 850 | 2630 | 830 |
| 27 | 1260 | 3250 | 1.8 | -0.7 | -6.8 | -1.3 | -7.7 | 7.7 | 2590 | 770 | 2580 | 770 |
| 28 | 1280 | 3370 | 1.8 | -0.3 | -7.5 | -0.2 | -9.5 | 9.7 | 2790 | 810 | 2790 | 810 |
| 29 | 1300 | 3460 | 2.0 | -0.3 | -7.9 | -0.1 | -11.2 | 11.2 | 3290 | 1010 | 3290 | 1010 |
| 30 | 1300 | 3340 | 1.9 | -0.5 | -7.1 | -0.9 | -8.3 | 8.3 | 2610 | 780 | 2610 | 770 |
| 31 | 1280 | 3180 | 1.8 | -1.0 | -6.7 | -1.0 | -7.3 | 7.5 | 2660 | 770 | 2660 | 770 |
| 32 | 1260 | 3190 | 1.7 | -1.2 | -6.3 | -1.4 | -6.9 | 7.0 | 2580 | 780 | 2560 | 760 |
| 33 | 1280 | 3310 | 1.8 | -0.7 | -7.3 | -0.5 | -8.2 | 8.5 | 2770 | 750 | 2770 | 750 |
| 34 | 1300 | 3280 | 1.9 | -0.6 | -7.0 | -1.2 | -7.9 | 8.0 | 2750 | 820 | 2750 | 800 |
| 35 | 1280 | 3530 | 2.0 | -0.2 | -7.8 | -0.1 | -11.8 | 11.8 | 3150 | 940 | 3150 | 940 |
| 36* | 1360 | 3370 | 2.6 | -1.8 | -5.0 | -2.1 | -6.1 | 6.3 | 1070 | 130 | 60 | 5 |
| 37* | 1360 | Unable to measure due to incomplete sintering | | | | | | | | | | |
| 38* | 1360 | Unable to measure due to incomplete sintering | | | | | | | | | | |
| 39* | 1360 | 3930 | 2.8 | -10.3 | -8.9 | -14.8 | -16.9 | 21.0 | 2030 | 390 | 110 | 30 |
| 40* | 1360 | Unable to measure due to incomplete sintering | | | | | | | | | | |
| 41* | 1260 | 3070 | 1.7 | -1.8 | -5.9 | -2.1 | -6.4 | 6.4 | 2250 | 580 | 680 | 140 |

*Asterisked samples are outside the scope of the present invention.

It is apparent from Tables 4 and 5 that the multilayer ceramic capacitor of the present invention (in which the dielectric ceramic layer contains $Al_2O_3$—MO—$B_2O_3$ oxide glass) is characterized by a permittivity higher than 3000, a dielectric loss lower than 2.5% and a small rate of change with temperature in electrostatic capacity which meets requirement B provided in the JIS standards in the range of -25° C. to 85° C. and also meets requirement X7R provided in the EIA standards within the range of -55° C. to 125° C. It is also noted that plating does not deteriorate the electrical properties.

erbium oxide, and ytterbium oxide, manganese oxide, cobalt oxide, nickel oxide and magnesium oxide); however, it is also possible to use them in the form of a solution of alkoxide or organometallic compound without adversely affecting the characteristic properties so long as their amount accords with the composition specified in the present invention.

EFFECT OF THE INVENTION

The multilayer ceramic capacitor pertaining to the present invention is made of a dielectric ceramic material which does not become a semiconductor due to reduction even when fired in a reducing atmosphere. This makes it possible to make its electrodes from nickel or nickel alloy (which is a base metal). This in turn makes it possible to perform firing at a comparatively low temperature (1300° C. and below). These features contribute to cost saving.

Owing to the specific dielectric ceramic material, the multilayer ceramic capacitor pertaining to the present invention has a permittivity of 3000 and above and has a small rate of change with temperature in electrostatic capacity.

In addition, it has a high insulation resistance in a high electric field strength and also has a long life time at high temperatures. This makes it possible to reduce the thickness of the dielectric ceramic layers without reducing the rated voltage.

In the multilayer ceramic capacitor of the present invention, the dielectric ceramic layer is composed of fine crystal grains not larger than about 1 μm. This offers the advantage that there can exist more crystal grains in the thin dielectric ceramic layer than in the case of conventional multilayer ceramic capacitors. Therefore, the multilayer ceramic capacitor is highly reliable and has a large capacity despite its small size. In addition, it is suitable for surface mounting because it does not become deteriorated in electrical properties by plating.

What is claimed is:

1. A multilayer ceramic capacitor comprising a plurality of dielectric ceramic layers, a plurality of internal electrodes formed between adjacent ones of said ceramic layers such that edges are exposed at end faces of said dielectric ceramic layers, and external electrodes electrically connected to said exposed internal electrodes, characterized in that said dielectric ceramic layers are barium titanate containing about 0.02 wt % or less of alkali metal oxide as an impurity, at least one member of the group consisting of yttrium oxide, terbium oxide, dysprosium oxide, holmium oxide, erbium oxide and ytterbium oxide, and at least one member selected from the group consisting of manganese oxide, cobalt oxide and nickel oxide, represented by the compositional formula $(1-a-\beta) \{BaO\}_m \cdot TiO_2 + \alpha Re_2O_3 + \beta(Mn_{1-x-y}Ni_xCo_y)O$ where $Re_2O_3$ is at least one of $Y_2O_3$, $Tb_2O_3$, $Dy_2O_3$, $Ho_2O_3$, $Er_2O_3$ and $Yb_2O_3$, $0.0025 \leq \alpha \leq 0.025$
$0.0025 \leq \beta \leq 0.05$
$\beta/\alpha \leq 4$
$0 \leq y < 1.0$
$0 \leq y < 1.0$
$0 \leq x+y < 1.0$
$1.000 < m \leq 1.035$, magnesium oxide in an amount of about 0.1–3.0 mols in terms of MgO per 100 mol of said compositional formula, and about 0.2–3.0 parts by weight of $Al_2O_3$—MO—$B_2O_3$ oxide glass where MO is at least one member selected from the group consisting of BaO, CaO, SrO, MgO, ZnO and MnO per 100 parts by weight of the total amount of said compositional formula and said magnesium oxide.

2. The multilayer ceramic capacitor of claim 1, wherein said barium titanate contains about 0.012 wt% or less of alkali metal oxide as an impurity, $0.003 \leq \alpha \leq 0.0125$, $0.004 \leq \beta \leq 0.024$, $\beta/\alpha \leq 1.2$, $0.1 \leq x < 0.9$, $0.2 \leq y < 0.9$, $5 \leq x+y < 0.9$, $1.005 < m \leq 1.015$, the amount of MgO is about 0.5–2 mols per 100 mols of principal component and the amount of oxide glass is about 0.8–2 parts per 100 parts of the total amount of said compositional formula and said magnesium oxide.

3. The multilayer ceramic capacitor of claim 2, wherein said $Al_2O_3$—MO—$B_2O_3$ oxide glass has a composition (in mol %) defined by the region on and within six straight lines joining six points defined as follows in a $\{Al_2O_3\text{-}MO\text{-}B_2O_3\}$ phase diagram:

A (1, 14, 85)
B (20, 10, 70)
C (30, 20, 50)
D (40, 50, 10)
E (20, 70, 10)
F (1, 39, 60).

4. The multilayer ceramic capacitor of claim 3, wherein said internal electrodes are nickel or nickel alloy.

5. The multilayer ceramic capacitor of claim 4, wherein said external electrodes comprise a sintered layer of electrically conductive metal powder.

6. The multilayer ceramic capacitor of claim 5, wherein said sintered layer of electrically conductive metal powder has a plated layer thereon.

7. The multilayer ceramic capacitor of claim 1, wherein said $Al_2O_3$—MO—$B_2O_3$ oxide glass has a composition (in mol %) defined by the region on and within six straight lines joining six points defined as follows in a $\{Al_2O_3$—MO—$B_2O_3\}$ phase diagram:

A (1, 14, 85)
B (20, 10, 70)
C (30, 20, 50)
D (40, 50, 10)
E (20, 70, 10)
F (1, 39, 60).

8. The multilayer ceramic capacitor of claim 7, wherein said internal electrodes are nickel or nickel alloy.

9. The multilayer ceramic capacitor of claim 8, wherein said sintered layer of electrically conductive metal powder has a plated layer thereon.

10. The multilayer ceramic capacitor of claim 1, wherein said internal electrodes are nickel or nickel alloy.

11. The multilayer ceramic capacitor of claim 10, wherein said sintered layer of electrically conductive metal powder has a plated layer thereon.

12. A ceramic composition which comprises barium titanate containing about 0.02 wt % or less of alkali metal oxide as an impurity, at least one member selected from the group consisting of yttrium oxide, terbium oxide, dysprosium oxide, holmium oxide, erbium oxide and ytterbium oxide, and at least one member selected from the group consisting of manganese oxide, cobalt oxide and nickel oxide, represented by the compositional formula $(1-\alpha-\beta) \{BaO\}_m \cdot TiO_{2+\alpha Re2}O_{3+\beta(Mn1-x-y}Ni_xCo_y)O$ where $Re_2O_3$ is at least one of $Y_2O_3$, $Tb_2O_3$, $Dy_2O_3$, $Ho_2O_3$, $Er_2O_3$ and $Yb_2O_3$, $0.0025 \leq \alpha \leq 0.025$
$0.0025 \leq \beta \leq 0.05$
$\beta/\alpha \leq 4$
$0 \leq x < 1.0$
$0 \leq y < 1.0$
$0 \leq x+y < 1.0$ $1.000 < m \leq 1.035$, magnesium oxide in an amount of about 0.1–3.0 mol in terms of MgO per 100 mol of said compositional formula, and about 0.2–3.0 parts by weight of $Al_2O_3$—MO—$B_2O_3$ oxide glass where MO is at least one oxide selected from the group consisting of BaO, CaO, SrO, MgO, ZnO and MnO per 100 parts by weight of the total amount of said compositional formula and said magnesium oxide.

13. The ceramic composition of claim 12, wherein said barium titanate contains about 0.012 wt % or less of alkali metal oxide as an impurity, $0.003 \leq \alpha \leq 0.0125$, $0.004 \leq \beta \leq 0.024$, $\beta/\alpha \leq 1.2$, $0.1 \leq x < 0.9$, $0.2 \leq y < 0.9$, $5 \leq x+y < 0.9$, $1.005 < m \leq 1.015$, an amount of MgO of about 0.5 2 mols per 100 mols of principal component and the amount of oxide glass is about 0.8–2 parts per 100 parts of the total amount of said compositional formula and said magnesium oxide.

14. The ceramic composition of claim 13, wherein said $Al_2O_3$—MO—$B_2O_3$ oxide glass has a composition (in mol %) defined by the region on and within six straight lines joining six points defined as follows in a $\{Al_2O_3$—MO—$B_2O_3\}$ phase diagram:

A (1, 14, 85)
B (20, 10, 70)
C (30, 20, 50)
D (40, 50, 10)
E (20, 70, 10)
F (1, 39, 60).

15. The ceramic composition of claim 14, wherein MO is Dy.

16. The ceramic composition of claim 14, wherein MO is a combination of said oxides.

17. The ceramic composition of claim 12, wherein said $Al_2O_3$-MO-$B_2O_3$ oxide glass has a composition (in mol %) defined by the region on and within six straight lines joining six points defined as follows in a $\{Al_2O_3$—MO—$B_2O_3\}$ phase diagram:

A (1, 14, 85)
B (20, 10, 70)
C (30, 20, 50)
D (40, 50, 10)
E (20, 70, 10)
F (1, 39, 60).

18. The ceramic composition of claim 17, wherein MO is Dy.

19. The ceramic composition of claim 17, wherein MO is a combination of said oxides.

* * * * *